(12) United States Patent
Mayatskikh et al.

(10) Patent No.: US 9,727,256 B1
(45) Date of Patent: Aug. 8, 2017

(54) VIRTUAL MEMORY MANAGEMENT TECHNIQUES

(71) Applicant: EMC IP Holding Company LLC, Hopkinton, MA (US)

(72) Inventors: Vitaly Mayatskikh, Arlington, MA (US); Christopher M. Gould, Lunenburg, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 14/585,595

(22) Filed: Dec. 30, 2014

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01)
(58) Field of Classification Search
None
See application file for complete search history.

(56) References Cited

U.S. PATENT DOCUMENTS

2014/0281324 A1\* 9/2014 Duluk, Jr. ............... G06F 12/08
711/165
2014/0281358 A1\* 9/2014 Duluk, Jr. ............. G06F 11/073
711/206

OTHER PUBLICATIONS

VNXe3200 OE Directed Availability Release SW 3.1.0.4202656, Nov. 7, 2014, release notes.

\* cited by examiner

*Primary Examiner* — Gary W Cygiel
(74) *Attorney, Agent, or Firm* — Muirhead and Saturnell, LLC

(57) ABSTRACT

Described are techniques that map virtual to physical memory. A first module may be loaded into a first physical memory location mapped, using a first page size, to a first virtual address space. A virtual memory portion of the first virtual address space may be identified that is a virtual address range mapped to at least a portion of the first physical memory location including the first module. First data of the first physical memory location may be copied to a second physical memory location. A set of pages of physical memory may be identified. Each such page may be a second page size. The virtual memory portion may be remapped to the set of pages using a page size that is the second page size. The first data may be copied from the second physical memory location to the set of one or more pages of physical memory.

20 Claims, 12 Drawing Sheets

VIRTUAL MEMORY MANAGEMENT TECHNIQUES

BACKGROUND

Technical Field

This application generally relates to virtual memory management techniques.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of mapping virtual memory to physical memory comprising: loading a first module into a first physical memory location that is mapped to a first virtual address space using a first page size; identifying a virtual memory portion of the first virtual address space, said virtual memory portion identifying a virtual address range that is mapped to at least a portion of the first physical memory location including the first module; copying first data to a second physical memory location, where the first data is included in the first physical memory location mapped to the virtual memory portion; identifying a set of one or more pages of physical memory, each of said one or more pages being a second page size different than the first page size; remapping the virtual memory portion to the set of one or more pages using a page size that is said second page size; and copying the first data from the second physical memory location to the set of one or more pages of physical memory. The second physical memory location may be mapped to the first virtual address space using pages of the first size. The method may include deallocating the second physical memory location after completing said copying the first data from the second physical memory location. The first module may include any of code and data. The data may be any of read only and read-write. The first page size may be smaller than the second page size. The first page size may be 4 kilobytes and the second page size may be 2 megabytes. The first module may be a shared library including code, read only data, and read-write data. The code and the read only data of the first module may be included in the virtual memory portion. The read-write data may not be included in the virtual memory portion. Loading the first module into a first physical memory location may be performed by first code executing in user space performing a first call to other code in kernel mode to perform the loading. The first code may perform a second call to second code that executes in kernel mode and causes said second code to perform processing including: said copying first data to a second physical memory location, said identifying a set of one or more pages of physical memory, said remapping, and said copying the first data from the second physical memory location to the set of one or more pages of physical memory. The method may be performed in a data storage system. The method may be performed in a computer system.

In accordance with another aspect of the invention is a system comprising: a processor; and a memory including code stored thereon that, when executed, performs a method comprising: identifying a first module currently stored in a first physical memory location that is mapped to a first virtual address space using a first page size; identifying a virtual memory portion of the first virtual address space, said virtual memory portion identifying a virtual address range that is mapped to at least a portion of the first physical memory location including the first module; copying first data to a second physical memory location, where the first data is included in the first physical memory location mapped to the virtual memory portion; identifying a set of one or more pages of physical memory, each of said one or more pages being a second page size different than the first page size; remapping the virtual memory portion to the set of one or more pages using a page size that is said second page size; and copying the first data from the second physical memory location to the set of one or more pages of physical memory.

In accordance with another aspect of the invention is computer readable medium comprising code stored thereon that, when executed, performs a method comprising: identifying a first module currently stored in a first physical memory location that is mapped to a first virtual address space using a first page size; identifying a virtual memory portion of the first virtual address space, said virtual memory portion identifying a virtual address range that is mapped to at least a portion of the first physical memory location including the first module; copying first data to a second physical memory location, where the first data is included in the first physical memory location mapped to the virtual memory portion; identifying a set of one or more pages of physical memory, each of said one or more pages being a second page size different than the first page size; remapping the virtual memory portion to the set of one or more pages using a page size that is said second page size; and copying the first data from the second physical memory location to the set of one or more pages of physical memory. The method may include loading the first module into the first physical memory location that is mapped to the first virtual address space using the first page size. The second physical memory location may be mapped to the first virtual address space using pages of the first size. The first module may include any of code and data, and wherein the first page size is smaller than the second page size. A memory mapping structure may be used by an operating system to identify a virtual to physical memory mapping and may include information that identifies the remapping of the virtual memory portion to the set of one or more pages using a page size that is said second page size, and wherein the memory mapping structure identifies a first file on a first file system used by the operating system, and the method further includes modifying the memory mapping structure to additionally identify a second file including the first module.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
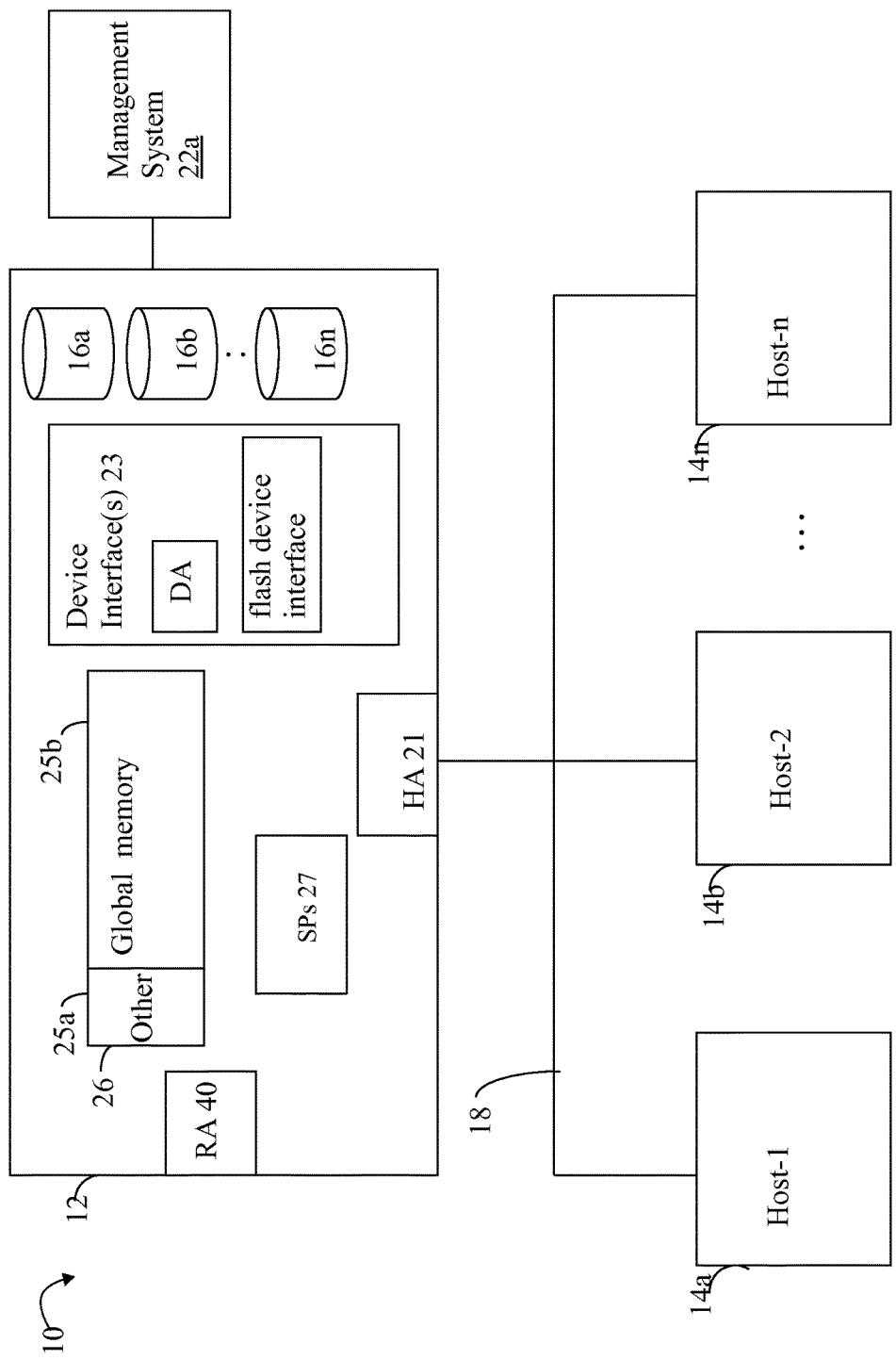
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

A data storage system, or more generally, any suitable system with one or more processors such as a computer system, may perform virtual memory management.

Virtual memory may be characterized as a memory management technique that may be implemented using both hardware and software. Memory addresses that may be used by a program are called virtual addresses. With virtual memory management, virtual addresses are mapped into physical addresses in physical memory. Main storage as seen by a process or task appears as a virtual address space that is a logically contiguous address space or collection of contiguous segments. The operating system manages virtual address spaces and the assignment of real memory to virtual memory. Address translation hardware in the CPU, often referred to as a memory management unit or MMU, automatically translates virtual addresses to physical addresses. Software within the operating system may extend these capabilities to provide a virtual address space that can exceed the capacity of real memory and thus reference more memory than is physically present in the computer.

Thus, when a program is executing and references a virtual address, processing may be performed by the operating system to translate the virtual address into a physical address location of memory including the referenced code or data. If the referenced code or data is not currently stored in memory, a page fault occurs and the referenced content is loaded, for example, from a storage device, into memory.

With virtual memory, the virtual address space of an application may be partitioned into contiguous portions each referred to as a page. Thus, each virtual address may be represented as a page number and a location or offset within that page. A page table is a data structure that maybe used by the operating system where the page table stores the mappings of virtual addresses to physical addresses. Each mapping may correspond to a row or entry in the table als known as a page table entry (PTE).

The CPU's memory MMU may store the recently used mappings from the operating system's page table in a cache. The cache of page table mappings may also be referred to as a translation lookaside buffer (TLB) and may be, for example, an associative cache.

Thus, when a virtual address needs to be translated into a physical address, the TLB is searched first to determine whether the PTE or mapping is in the TLB. If a match is found thereby resulting in a TLB cache hit, the physical address corresponding to the virtual address is returned and memory access can continue. However, if there is no match thereby resulting in a TLB miss, an exception may occur resulting in an exception handler being invoked. The handler typically looks up the address mapping for the virtual address of interest in the page table (often referred to as a page table walk) to see whether a mapping exists. If so, the mapping may be written or cached in the TLB, and the faulting instruction is restarted to again reference the virtual address. On this subsequent reference to the virtual address, the TLB is again searched and this time results in a TLB hit, and the memory access continues.

Each TLB entry also maps a single page of virtual address space to physical memory Thus, the smaller the page size, the more TLB entries required to store the mappings for an amount of virtual address space.

A module, such as a binary or executable file (.EXE file) (e.g., for a program or a library) may be stored in a file on a physical storage device. Such an executable or binary file may be loaded into memory by the operating system for execution. The executable or binary file may be generated, for example, as a result of compiling and linking a source program, such as C or other programming language file. It should be noted that any suitable technique known in the art may be used to generate the binary or executable file which is stored as a file in a file system which the operating system may then load into memory for execution. The operating system may load the contents of executable file into physical memory which may then be mapped to a portion of the process virtual address space. The operating system may load the contents of the executable file by reading the contents of the file.

Figure 2:
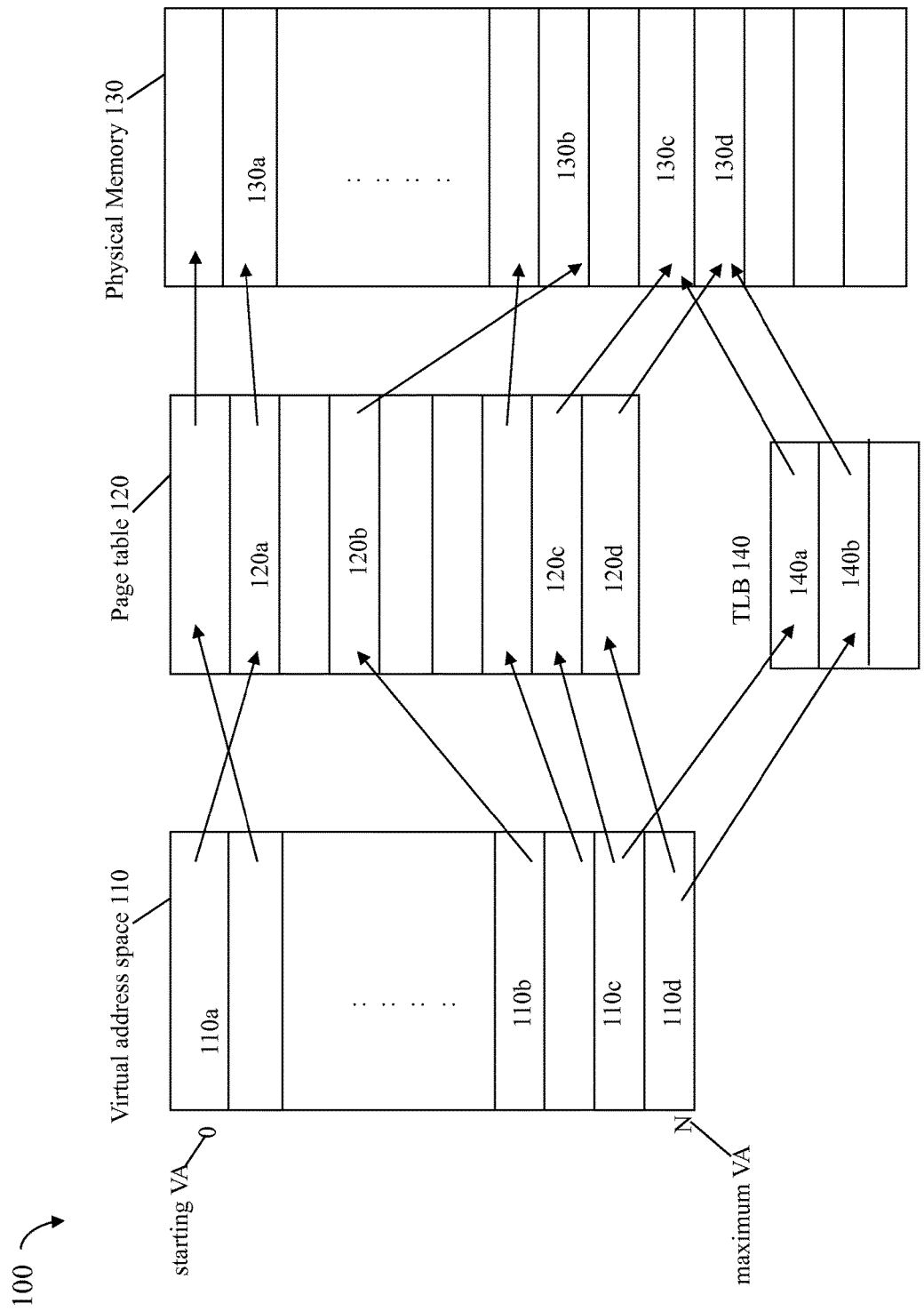
FIG. 2 is an example illustrating components of virtual memory management that may be performed in an embodiment in accordance with techniques herein.

Referring to FIG. 2, shown is an example of components that may be used in connection with virtual memory management in an embodiment in accordance with techniques herein. In the example 100, the virtual address space 110 may have a starting virtual address (VA) 0 and a maximum VA of N whereby 0 through N, inclusively may represent a virtual address space of a process or task. As discussed above and elsewhere herein, the VA space 110 may be partitioning in page size portions such as represented by portions 110a-d. As discussed above and elsewhere herein, page table 120 may include PTEs such as 120a-120d each including mapping information that maps a page size of virtual address space to a page size portion of physical memory 130. Thus, physical memory 130 is also shown as being partitioned into portions, such as 130a-d, each of a page size. For example PTE 120a maps VA portion 110a to physical memory portion 130a, PTE 120b maps VA portion 110b to physical memory portion 130b, PTE 120c maps VA portion 110c to physical memory portion 130c, and PTE 120d maps VA portion 110d to physical memory portion 130d. Additionally, FIG. 2 also includes a TLB 140 including mapping information 140a and 140b. In this example, 140a denotes the same virtual to physical mapping information as PTE 120c and 140b denotes the same virtual to physical mapping information as PTE 120d.

Virtual memory management may maintain a different page table or set of mapping information for each process's virtual address space. Thus, the TLB contents is specific to each process in the system when the process is currently executing. Each time the operating system performs a context switch to execute a different process with its own virtual address space, the operating system flushes the current contents of the TLB or reinitializes the TLB to start fresh with the new process.

In an architecture such as the Intel X86 architecture, the page size of 4 KB may be used. One problem with such a small page size is that the TLB cache may not be large enough to support the virtual address space. For a page size of 4 KB, the TLB may hold an insufficient number of entries for the process virtual address space. For example, the TLB may only cache approximately 1,000 page table entries or mappings. To support the process virtual address space range for a process using a large portion of the available virtual address space, it may be desirable to have the TLB cache, for example, approximately 10,000 page table entries or mappings in order to increase the number of TLB cache hits. However, increasing the TLB size may not be practical or possible, for example, since the TLB is hardware specific and also due to increased costs associated with the larger TLB.

Rather than increase the size of the TLB, another solution is to increase the page size to be larger than 4 KB so that each mapping or PTE cached in the TLB maps a larger portion of the virtual address space into physical memory. Thus, by increasing the page size, the total amount of virtual address space mapped by each entry of the TLB, and this mapped by the entire TLB, may be increased. Some hardware architectures may support multiple page sizes. For example, the Intel X86 architecture supports two page sizes of 4 KB and 2 MB and also a 1 GB page size but for data only. Thus, with a 2 MB page size rather than a 4 KB page size, each PTE or mapping entry cached in the TLB maps 512 times the amount of virtual address space (e.g., 2 MB is 4 KB*512).

In some systems operating in accordance with techniques herein, as noted above, the hardware architecture, such as the Intel X86 architecture, may support multiple pages sizes, such as 4 KB and 2 MB, for virtual memory management but the operating system may not. For example, an operating system executing on a system based on the Intel X86 architecture may only generally support use of one page size, such as the smaller 4 KB page size, and may have limited support for use of other larger page sizes, such as 2 MB pages. LINUX is one such operating system which has limited support for use of "huge" pages with a 2 MB page size. LINUX has a memory based file system, HUGETLBFS which allows limited use of huge pages with a size of 2 MB. In LINUX, only files placed in the HUGETLBFS file system may be used with the 2 MB page size. In other words, one cannot use the 2 MB page size with mapped files for modules, such as executables or binaries, existing in the regular file system.

Not all executable files, or more generally modules, may be easily and readily used with the HUGETLBFS with a 2 MB page size. For example, executable code cannot be directly loaded into HUGETLBFS without significant modification to the shared object loader and tools since such tools may only work with the standard 4 KB page size. Due to the foregoing and other restrictions, use of 2 MB page size may not be readily and easily used with existing modules such as executable files which are shared libraries.

Described in following paragraphs are techniques that use a larger page size, such as 2 MB, with a module, such as an executable file, in an environment where the hardware may support multiple pages sizes, such as 4 KB and 2 MB, but the existing operating system may not readily support use of the larger page size, such as 2 MB. More generally, techniques are described in following paragraphs that allow existing executable files, including code and/or data, to be used with a larger page size, such as 2 MB, in a manner that is transparent to the use. For example, in one embodiment in accordance with techniques herein, such techniques provide for use of the 2 MB without requiring modification to the existing module to which the techniques are being applied to migrate to the larger 2 MB page size.

As an example of a module that may be used with techniques herein, consider an executable file that is a shared object library such as may be stored on a form of non-volatile storage, such as a disk or flash-based drive. The executable file may be stored in a regular file system.

Figure 3:
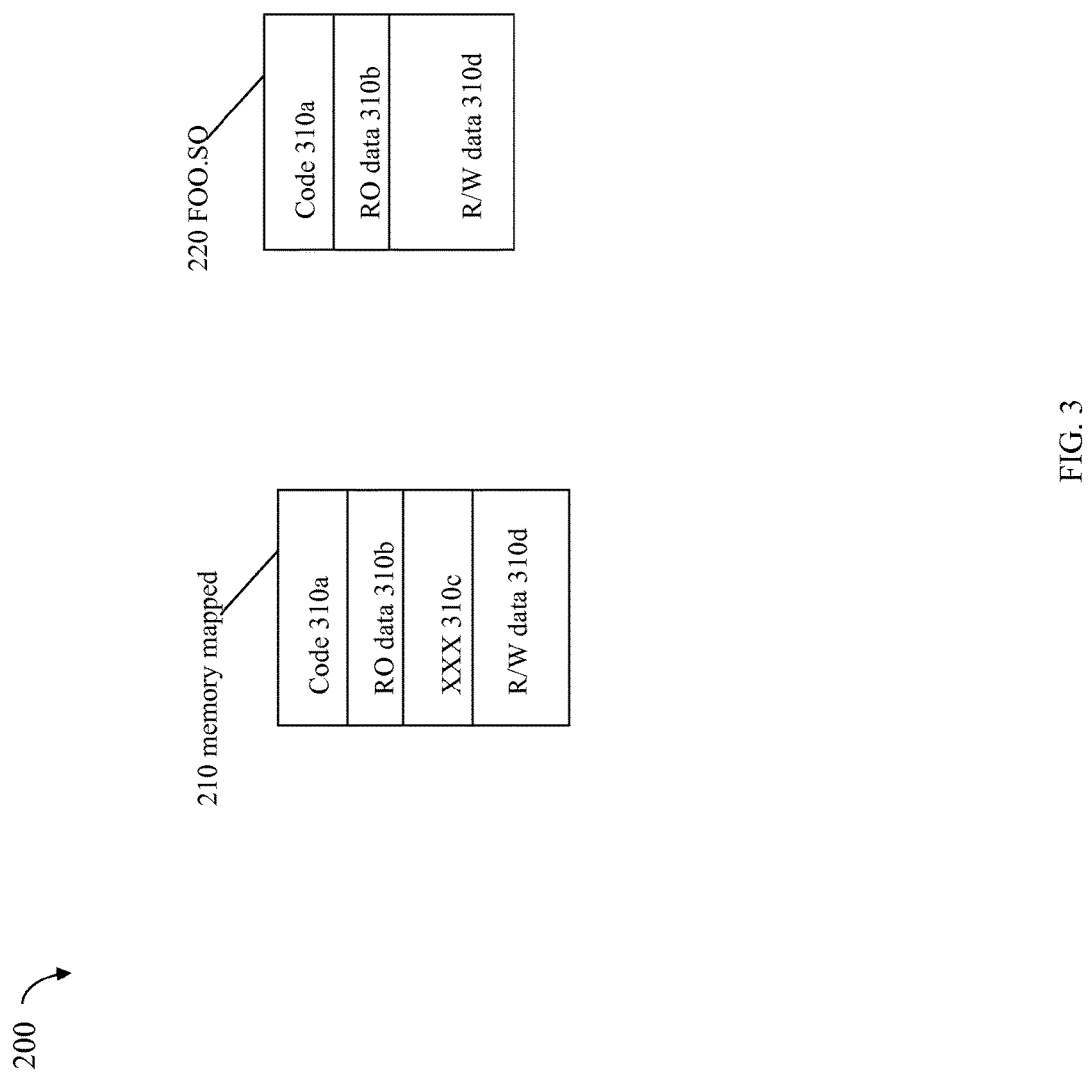
FIG. 3 is an example of a shared library that may be mapped in an embodiment in accordance with techniques herein.

Referring to FIG. 3, shown is an example of a shared object library that may be used in an embodiment in connection with techniques herein. The example 200 includes element 220 that may represent portions of a shared object library FOO.SO. FOO.SO 220 may include code 310a, RO (Read only) data 310b and R/W (read-write) data 310d. Element 220 may represent how the shared object library may be stored on disk. Element 210 may represent how the shared object library may be mapped into virtual memory of a process's virtual address space. In the representation 210, note that the code 310a and RO data 310b may be loaded as a single unit followed by a hole 310c in the virtual address space prior to the starting virtual address of the R/W data 310d. In an embodiment in accordance with techniques herein as described in following paragraphs, the code 310a and RO data 310b may be migrated from using 4 KB pages to using 2 MB pages for the virtual to physical mapping. In this case, as described in more detail below, element 310c may denote a padding of virtual address space so that the R/W data 310d begins on a 2 MB boundary.

Note that techniques herein may generally be used for mapping any code and/or data in 2 MB pages and is not limited to code and RO data. However, in one embodiment in accordance with techniques herein, portions of the executable file may be selectively chosen for placement in larger 2 MB pages. For example, in this case, the executable file 220 may be a shareable library from which only the code 310a and RO data 310b are to be stored or mapped using 2 MB pages.

As described in more detail below, techniques herein may include determining how many 2 MB pages are needed for the code 310a and R/O data 310b. It should be noted that this may be equal to the size of code and RO data rounded up to the next 2 MB boundary. In this example, the subsequent section of R/W data 310 d needs to be aligned on a 2 MB boundary, or generally, aligned on a boundary that is the size of the new larger page size to which the executable file is being migrated to use. The foregoing may be performed so that virtual addresses of the executable file which will not use the 2 MB page size (e.g., not be migrated to use the new page size) remain the same even after the code 310a and RO data 310b have been migrated to use the 2 MB page size. In one embodiment, the linker may automatically align the R/W data to begin on a 2 MB boundary. Other embodiments may use any suitable technique.

As described in more detail below, in at least embodiment in accordance with techniques herein, the HUGETLBFS file system may be used to allocated the needed number of huge pages of the 2 MB size. In one embodiment described herein with the LINUX operating system, this may be performed using the HUGETLBFS and existing API calls of the operating system.

For example, the following may represent a first API call used to allocate the needed number of 2 MB pages and identify the content or executable file to be stored in the allocated 2 MB pages:

file=Huge_tlb_setup(size)

where size may be a parameter denoting the size or number of 2 MB pages desired and file is the executable file.

The following may represent a second API call that maps the allocated 2 MB pages to a particular portion of the virtual address space at which the executable file contents is located:

do_mmap_pgoff(file, address, size . . . )

where file is the executable file as in the first API call;

address is the starting virtual address at which the allocated 2 MB pages are mapped; and size is the size specified in the first API call.

In this example, the address is the starting virtual address of the content (e.g., code and RO data in the executable file) to be mapped to the 2 MB pages. API calls used in an embodiment in accordance with techniques herein may include other parameters and have other formats and syntax than as described herein.

Figure 4:
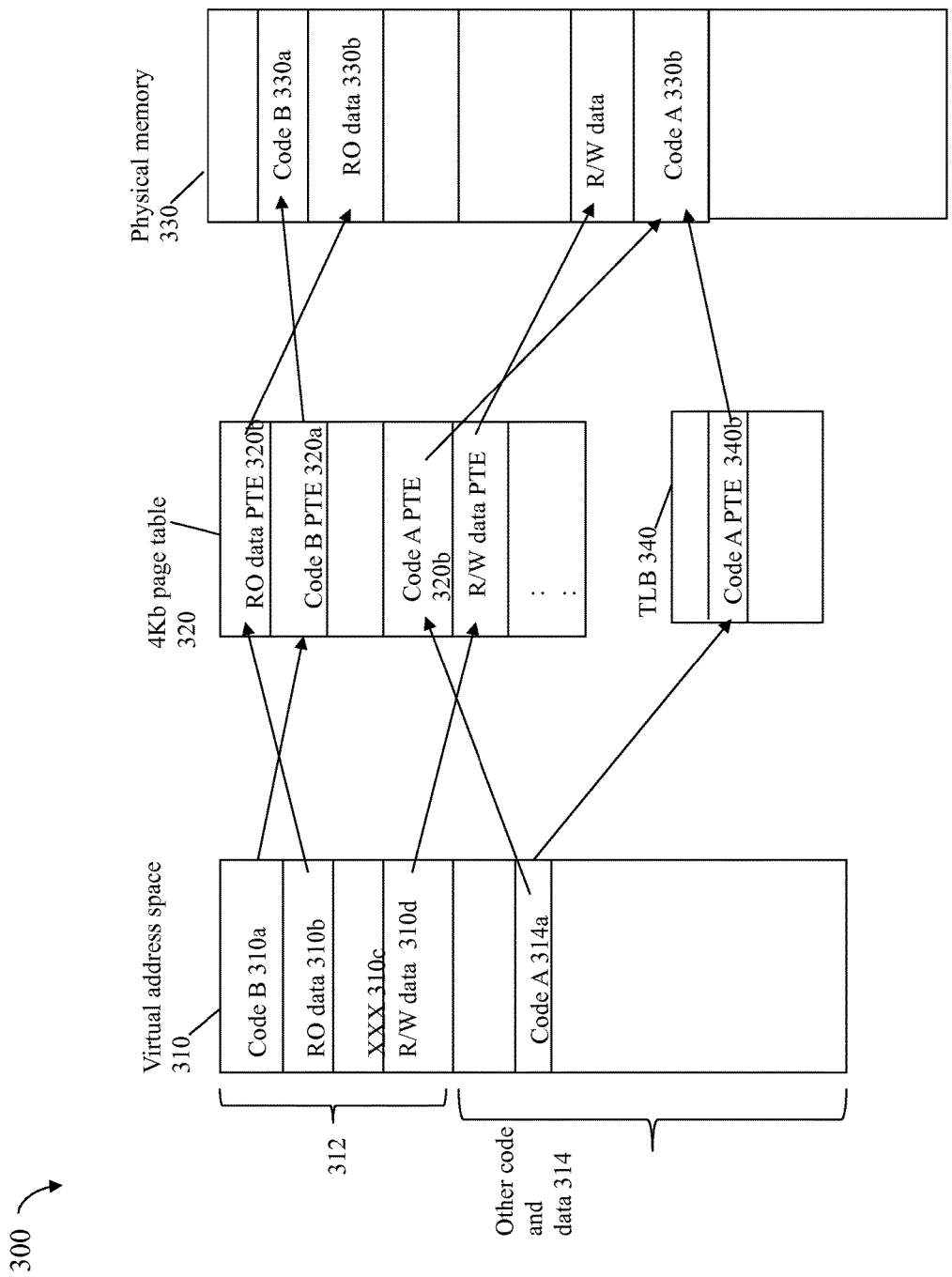
FIGS. 4, 5, 6, 7, 8A, 8B, 9, and 10 illustrate different states of components in an embodiment in accordance with techniques herein.

Referring to FIG. 4, shown is an example illustrating a first step in an embodiment in accordance with techniques herein. The example 300 may illustrate a first state when a user space process is loaded and running and the process uses the shared library.

The virtual address space 310 may denote a user process virtual address space. As illustrated in the example 300, the virtual address space 310 may have a first portion 312 that represents the mapping of the shared library executable file into the process virtual address space 310. The remainder of the virtual address space 310 is denoted by element 314. The portion 314 of the virtual address space may be mapped to other code and data, such as other code of the user process which makes calls into the shared library. The portion 314 of the virtual address space 310 may also include unmapped virtual addresses.

In this example, the total size of 310a, 310b and 310c may be 2 MB. Element 310c XXX may identify a blank or unused portion of virtual address space 310 (e.g., virtual address space "hole") which forces R/W data 310d to begin on a 2 MB virtual address boundary. It should also be noted that the size of the hole 310c may be further expanded to a next one or more 2 MB boundaries as may be needed for various reasons. For example, at least one embodiment in accordance with techniques herein may extend or expand the hole 310c by another 2 MB to enable subsequent loading of executable code and any RO data.

Element 320 may denote the 4 KB page table that maps 4 KB pages from virtual addresses of 310 to physical addresses in memory 330. For example, code B 310a may be mapped by code PTE 320a to physical memory location 330a. TLB 340 may include virtual to physical address mapping information of one or more PTEs from page table 320. For example, TLB 340 is illustrated as including a PTE or mapping information for code A 314a. In this example, the mapping information denoted by 340b may be cached copy of the mapping information of code A PTE 320b of the page table 320.

For simplicity of illustration, it should be noted that the code B 310a, RO data 310b, R/W data 310d, and code A 314a of the virtual address space 310 each only have a single PTE of page table 320. However, as will be appreciated by those skilled in the art, each of 310a, 310b, 310d and 314a may include multiple 4 KB portions each having a single corresponding PTE of table 320 that maps to a portion of physical memory 330.

Figure 5:
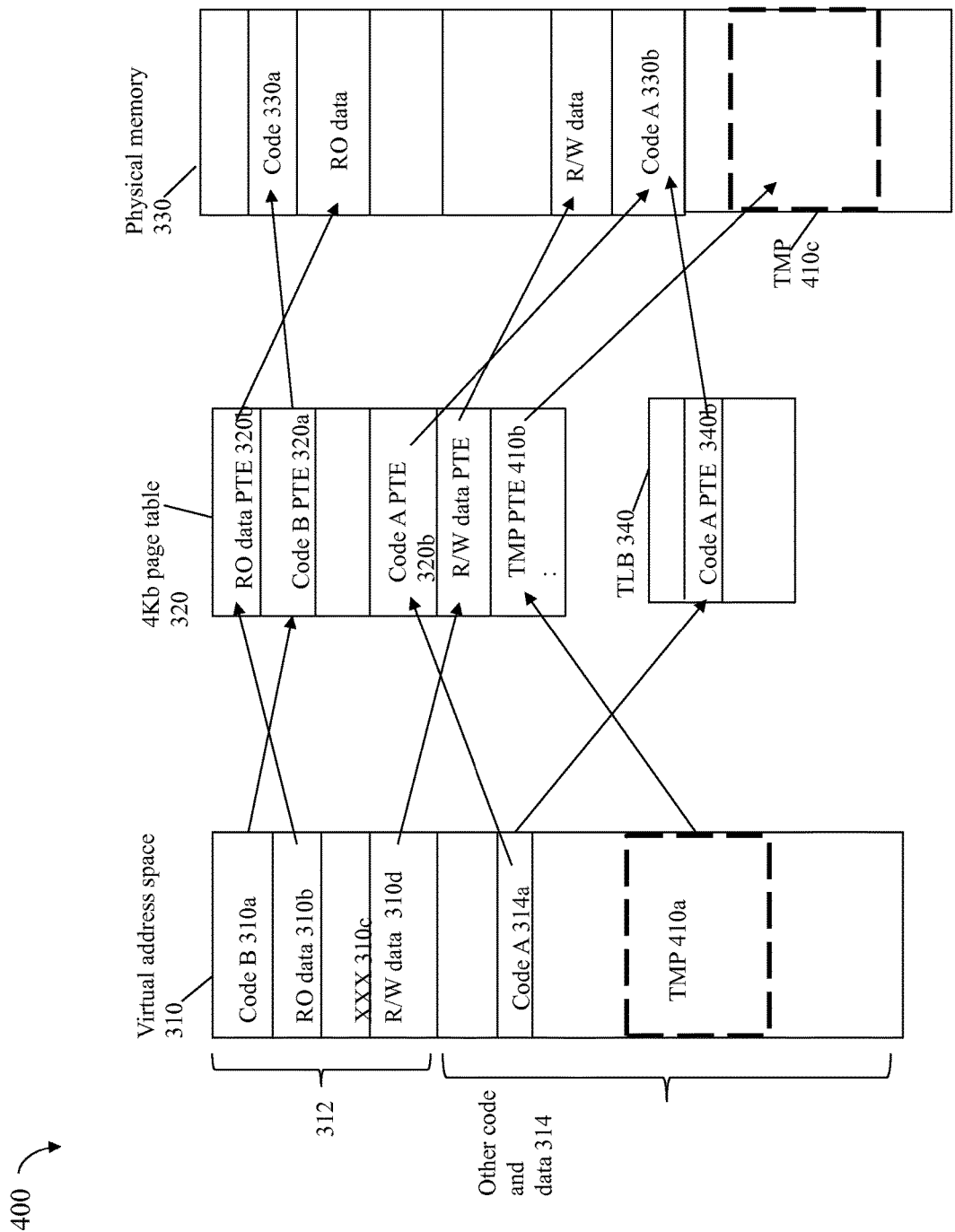

As noted above for this example, assume that a single 2 MB page is needed since 310a, 310b and 310c have a total size of 2 MB. Further assume that the total size of 310a and 310b is 1 MB. In this case, elements 320a and 320b of the 4 KB page table 320 may denote 256 PTEs (each PTE mapping 4 KB) for the 1 MB portion of physical memory denoted collectively by 330a and 330b Referring to FIG. 5, shown is an example illustrating a second step in an embodiment in accordance with techniques herein. In the example 400, a temporary buffer TMP 410c is allocated in physical memory 330 using a 4 KB page size. TMP 410c may be the size of code B 310a and RO data 310b that is to be migrated to use the 2 MB page size. It should be noted that in this example, XXX 310c may be characterized as unused and does not contain any code or data. Rather, 310c in this example is used to force 310d to begin on the next 2 MB boundary. If 310c included valid code or data used by the process, then the size of TMP 410c should be accordingly increased to include the size of 310c Element 410a may represent the virtual address range of the process virtual address space 310 for the TMP buffer 410c. The virtual address range 410a for TMP buffer may be mapped via TMP PTE 410b of the page table 320 to the physical memory 410c allocated for the TMP buffer.

For simplicity of illustration, it should be noted that TMP 410a of the virtual address space 310 has only a single PTE 410b of page table 320. However, as will be appreciated by those skilled in the art, 410a may include multiple 4 KB portions each having a single corresponding PTE of table 320 that maps to a portion of physical memory 330. For example, if the size of 310a and 310b collectively is 1 MB as noted above, then TMP 410c and 410a each correspond to a 1 MB portion and element 410b represents 256 PTEs (e.g., 4 KB*256=1 MB).

The memory 410c may be allocated using standard memory allocation APIs. For example, in one embodiment, the memory 410c may be allocated using the C-based malloc API call.

Figure 6:
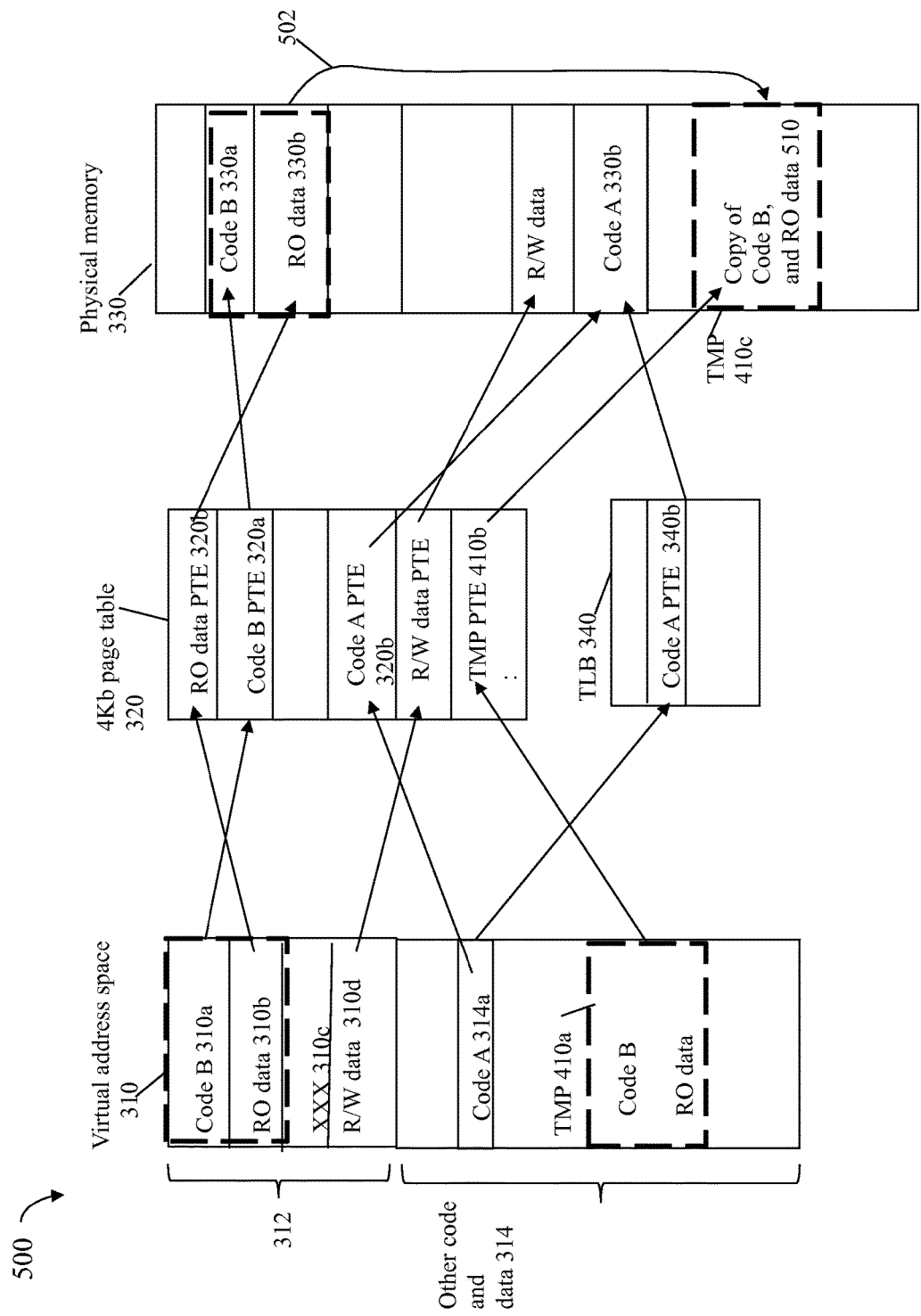

Referring to FIG. 6, shown is an example illustrating a third step in an embodiment in accordance with techniques herein. In the example 500, code B 330a and RO data 330b are copied 502 to the temporary buffer TMP 410c. Element 510 denotes the copy of the contents of 330a and 330b as stored in TMP 410c. It should be noted that if 310c included valid or usable code or data, then 310c would also be copied to 410. As also illustrated, element 410a denotes a portion of the virtual address space mapped to physical memory TMP 410c which now includes the copy 510 of code B and the RO data.

Figure 7:
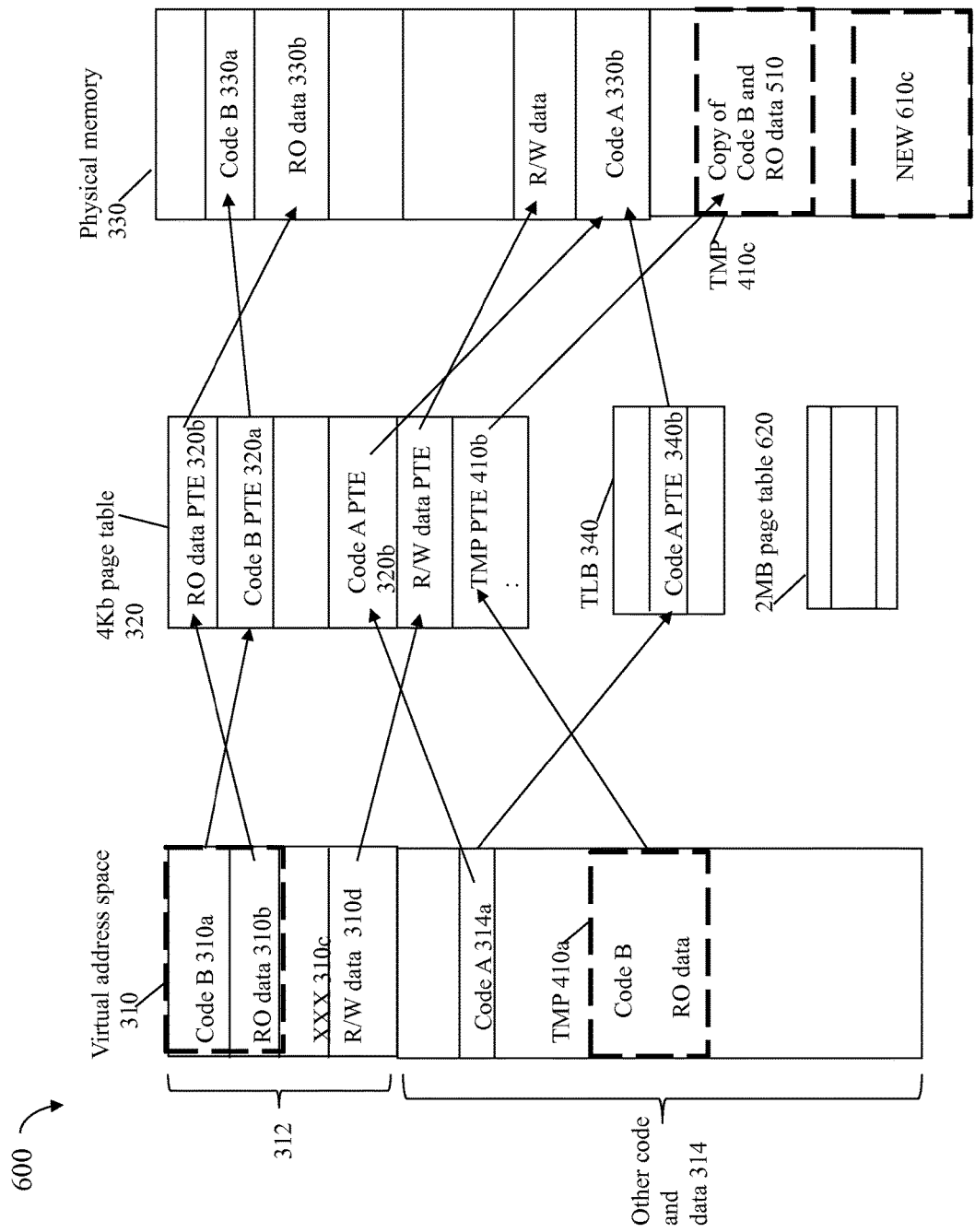

Referring to FIG. 7, shown is an example illustrating a fourth step in an embodiment in accordance with techniques herein. In the example 600, NEW 410c may be allocated in physical memory 330 using a 2 MB page size. NEW 610c may be 2 MB in this example which is the size of code B 310a and RO data 310b that is to be migrated to use the 2 MB page size, whereby the size is then further rounded up to the next 2 MB boundary.

In one embodiment using the LINUX operating system, the HUGE pages of the 2 MB page size may be allocated (or otherwise reserved from a previously allocated pool of 2 MB pages) in this fourth step as described elsewhere herein using the first API call mentioned above.

Element 620 may represent the 2 MB page table where each entry thereof maps a 2 MB portion of virtual address space to its corresponding location in physical memory 330.

Figure 8A:
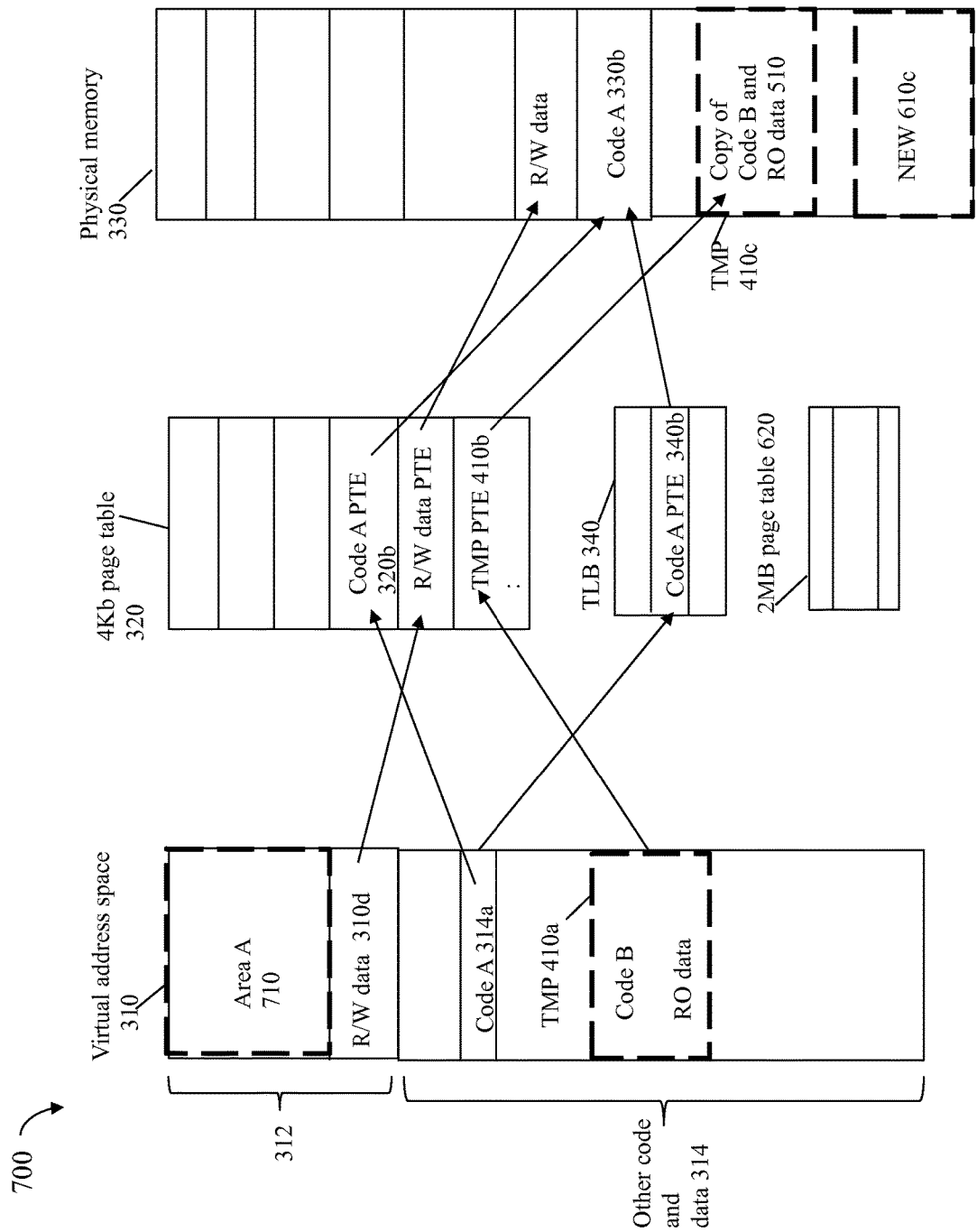

Referring to FIG. 8A, shown is an example illustrating results of performing a fifth step in an embodiment in accordance with techniques herein. In the example 700, area A 710 of the virtual address space may be unmapped from its corresponding physical memory locations. As a result of this unmapping, any PTEs current used to map virtual addresses of area A 710 to physical memory may be removed or otherwise invalidated. In this case, with reference back to FIG. 7, PTEs 320-b may be removed or invalidated in this unmapping operation and the physical memory 330a-b also made available for other uses. It should be noted that if 310c was also mapped via 256 PTEs of the 4 KB page table 320 to a portion of physical memory 330, this unmapping operation would also perform the unmapping with respect to 310c and these 256 PTEs.

Figure 8B:
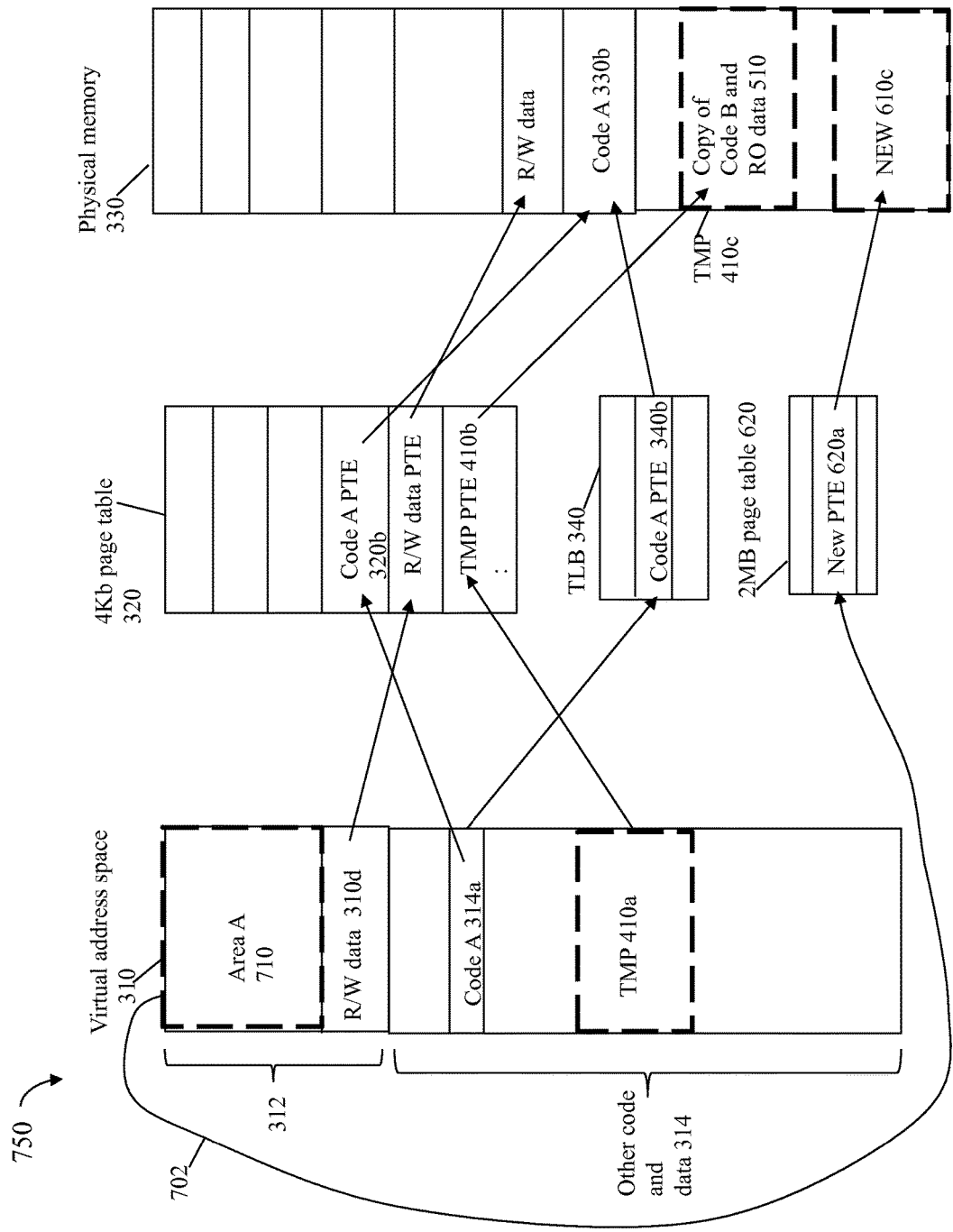

Referring to FIG. 8b, shown is an example illustrating a sixth step in an embodiment in accordance with techniques herein. In the example 750, area A 710 is now remapped 702 to the NEW portion of physical memory as denoted by element 610c. The virtual address range portion for area A 710 may be mapped via NEW PTE 620a of the 2 MB page table 620 to the physical memory 610c allocated for NEW. Each entry of the 2 MB page table 620 maps a 2 MB portion of virtual address space to a 2 MB portion of physical memory 330. In this example, the size of 310a and 310b is 2 MB and therefore fits into a single 2 MB portion mapped by a single PTE 620a of the 2 MB page table 620. This may be contrasted to 320a and 320b of the 4 KB page table 320 (as in FIG. 4) where 320a and 320b may collectively represent the 256 PTEs needed to map 310a, 310b to 330a, 330b, respectively.

It should be noted that the above-mentioned fifth and sixth steps may collectively represent a remap operation to remap the 2 MB virtual address portion denoted by 310a-c in FIG. 7 to the newly allocated 2 MB physical memory portion NEW 610c.

In one embodiment using the LINUX operating system, the remapping as described by the combination of the fifth and sixth steps may be performed by the second API call described elsewhere herein.

As a result of the remapping operation, the area A 710 of the virtual address space 310 is mapped to physical memory NEW 610c which is uninitialized.

Figure 9:
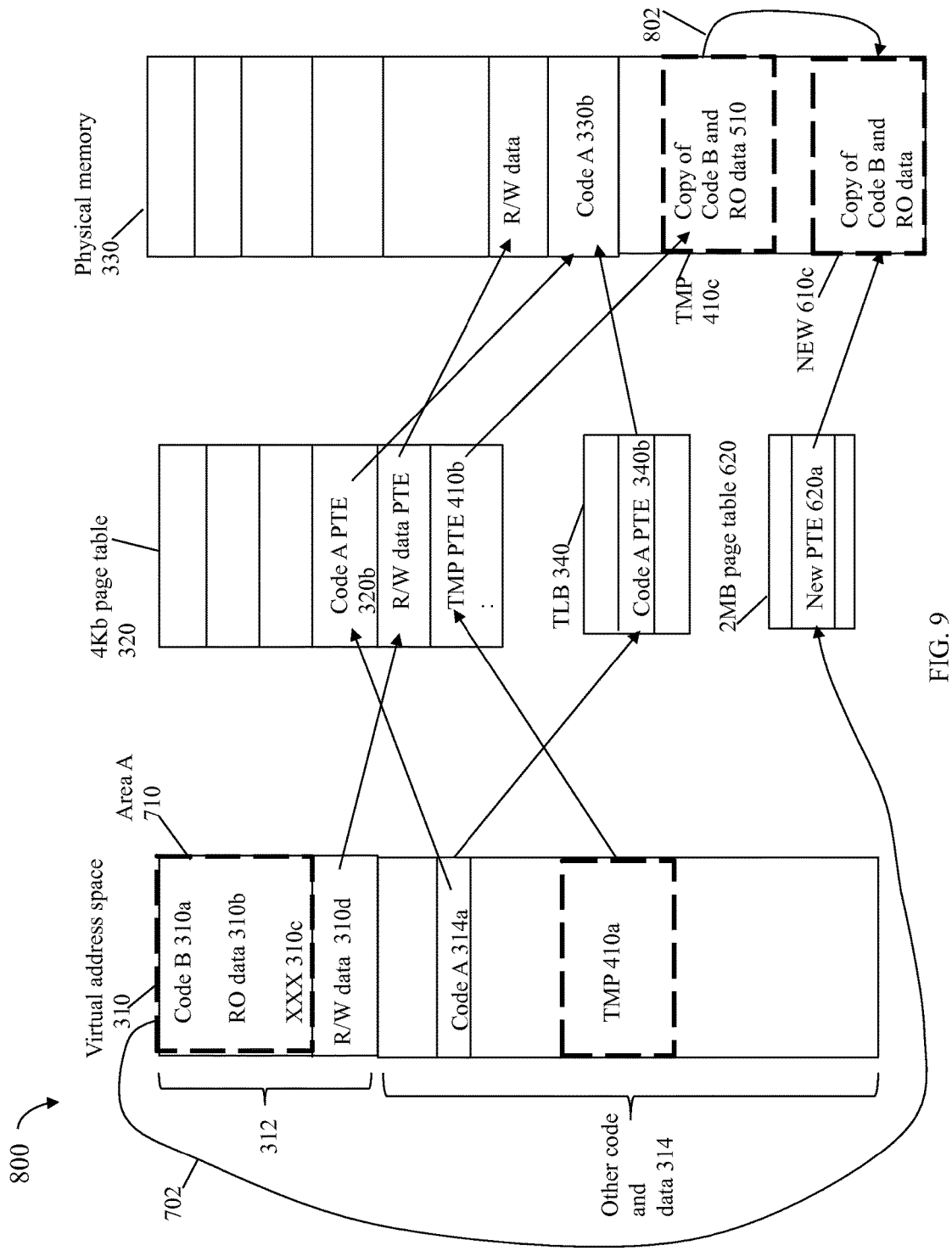

In a seventh step with reference to FIG. 9, processing may be performed to copy the data 510 from TMP 410c to NEW 610c as illustrated by the arrow 802. As a result of this copying 802, area A 710 of the virtual address space is now mapped again to a copy of code B 310a and a copy of the RO data 310b. Additionally, since the PTE 620a maps 2 MB portions, PTE 620a maps a 2 MB virtual address portion corresponding collectively to 310a, 310b and 310 to NEW 610c.

Figure 10:
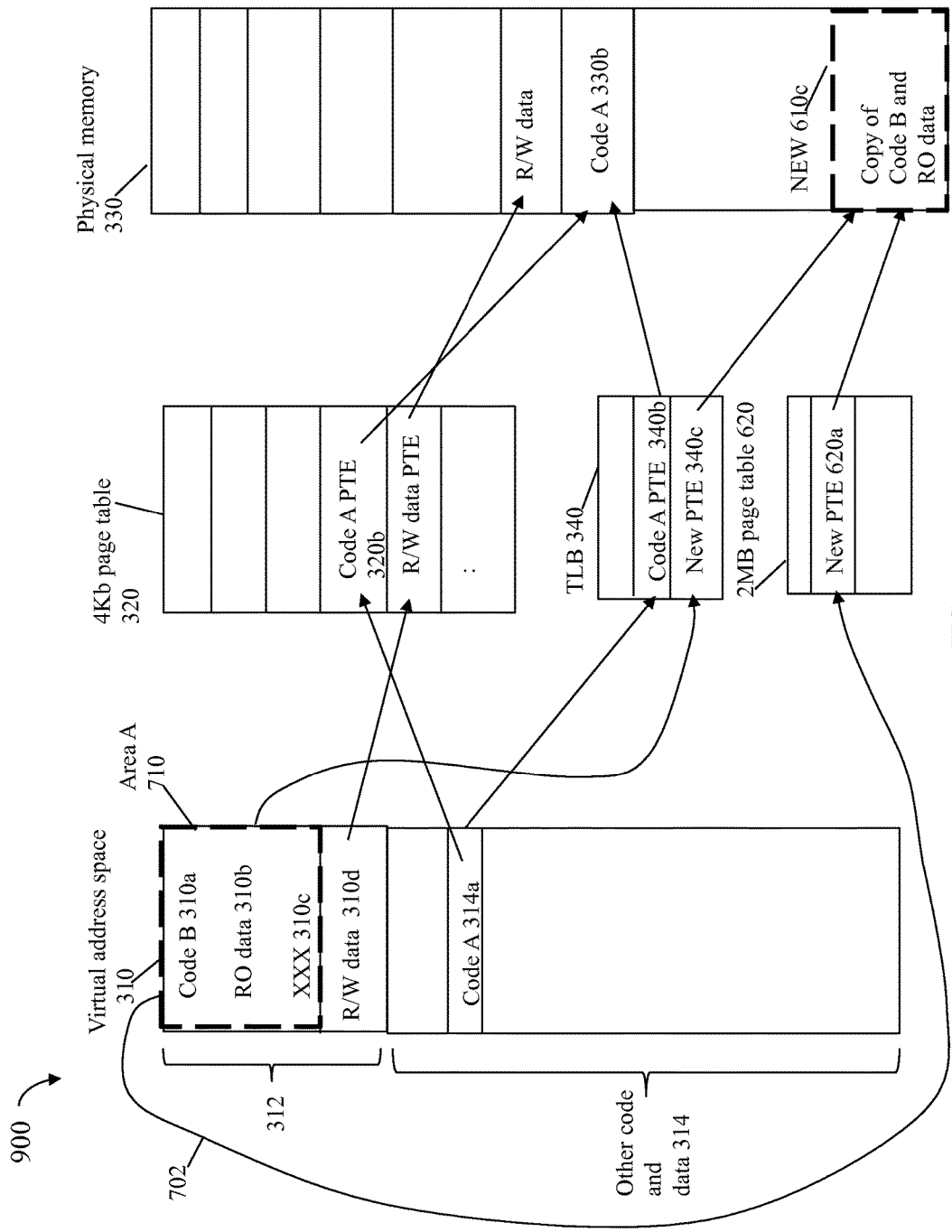

In an eighth step, processing may be performed to free or deallocate the physical memory previously allocated for TMP 410c resulting in the representation as illustrated in example 900 of FIG. 10. The memory 410c may be deallocated using standard memory deallocation APIs. Also illustrated in FIG. 10, the TLB 340 includes an additional entry with mapping information 340c. For example, code and/or data of NEW 610c may be frequently accessed so that mapping information of new PTE 620a may be cached in the TLB 340 as denoted in 340c. In this example, the mapping information 340c of the TLB 340 may map the virtual address 2 MB portion area A 710 to the 2 MB of physical memory denoted by NEW 610c.

It should be noted that the 2 MB memory portions allocated, such as NEW 610c, may be allocated with read and write attributes since processing performs a copy in the above-mentioned eight step. Once the copy has been completed, the attributes for the 2 MB memory portions may be further modified as desired. For example, with reference back to FIG. 10, the memory portion NEW 610c may have the attributes modified from read and write to read and execute since NEW 610c includes code and read only data.

In connection with the foregoing processing, an example is illustrated in which the executable file is a shared object library for a single user process address space. However, more generally, the techniques herein may be used with any binary code or executable code file that may be loaded for execution. It should be noted that with a shared library as described, in one embodiment in accordance with techniques herein using the LINUX operating system, the shared object library file, such as may be stored on non-volatile physical storage like a disk drive, may not be directly mapped to memory. Instead, the shared object loader loads the executable code portion, such as code B 310a, and the constant RO data, such as 310b as a single unit, leaves the hole 310c, and then loads the read write portion of the file including the shared object library.

Additionally, with a shared library, multiple processes may each load the same shared library that is mapped into the virtual address space of each of the multiple processes. In some embodiments in accordance with techniques herein, it may be typical to only have a single memory copy of the unmodifiable portions (e.g., such as the code B 310a and RO data 310b) of the shared library. Using techniques just described herein, the shared library has been modified to use 2 MB pages, or more generally pages of a new size, rather than 4 KB, or more generally pages of an original size for portions of the library that are code or RO data. In one embodiment as described above accordance with techniques herein, a private copy of the code and RO data of the shared library (e.g, 310a and 310b) are now made for each process or virtual address space in the newly allocated 2 MB page portion, such as NEW 610c.

One problem with this private copy in huge page memory portions for each virtual address space is that the tools, such as debuggers (e.g., GNU debugger gdb in the LINUX operating system), execution profiling tools (e.g., perf in the LINUX operating system, a function trace tool such as ftrace in the LINUX operating system), and the like, may be adversely affected in that such tools may no longer be able to correlate addresses of executable code of the shared library (as mapped into the virtual address space) with the file of the shared object library (e.g., the physical copy of the shared object file such as stored on disk or other non-volatile storage which is loaded into memory). Such tools may use information included in the physical file, for example, to identify corresponding source code information (e.g., such as to identify a line of source code corresponding to a currently executed instruction, a name of a function including the currently executed instruction), to use symbol table information in the file to identify a program variable or user defined variable corresponding to a register currently having a value, and the like.

Every mapping of physical memory to virtual address space of a process may be tracked by the operating system. For example, in the LINUX operating system, every such memory mapping of virtual to physical memory may be tracked in a kernel data structure which stores information regarding the particular physical file, location in the file, and the like, which includes the code having its contents stored in the physical memory mapped to a virtual address portion. The foregoing kernel data structure may be referred to as a memory mapping structure of the kernel. Using techniques herein, the memory mapping structure instance may be created when mapping huge pages to a process virtual address space as just described. In one embodiment as described herein, the HUGETLFS file system may be used to allocate and map the 2 MB pages. In such a case, the memory mapping structure denoting the mapping may not identify the original physical file, such as the shared object file. For example, the memory mapping structure may identify a file in the HUGETLBFS file system. In LINUX, using the HUGETLBFS file system as described herein, this file pointer identifies a file on the HUGETLBFS files system that is used by the HUGETLBFS internal code. By default, it is this file information that is included in the mapping structure rather than file information for the original physical file, such as the shared object file. As a result, the memory mapping structure by default using HUGETLBFS identifies the wrong file (e.g., the internally used file on the HUGETLBFS file system) rather the shared object file and thus, the shared object file is not available to the tools which may typically use this physical file and the information contained therein. In one embodiment in accordance with techniques herein, the kernel memory mapping structure may be modified to identify the correct physical file for the shared object file, or other executable file, for which the mapping is performed. For example, an additional field may be added to the kernel memory mapping structure which identifies the correct physical file for the shared object file, or other executable file, for which the mapping is performed.

To further illustrate, in one embodiment using the LINUX operating system, an instance of the kernel memory mapping structure vm_area_struct structure is created for each memory mapping. The vm_area_struct structure may have the following general layout as specified with C programming like notation:

```
struct vm_area_struc{
    struct mm_struc *vm_mm;      /* identifies virtual address space to
                                    which the memory is mapped */
    unsigned long vm_start;      /* identifies starting virtual memory
                                    address of where the memory is
                                    mapped. The starting virtual
                                    memory address is in the virtual address
                                    space described by vm_mm */
    unsigned long vm_end;        /* identifies ending virtual memory
                                    address of where the memory is
                                    mapped. The starting virtual
                                    memory address is in the virtual address
                                    space described by vm_mm */
    :
    unsigned long vm_pgoff;      /* offset within vm_file in
                                    PAGE_SIZE units */
    struct file *vm_file;        /* identifies the physical file to which
                                    the memory maps */
    :
};
```

In LINUX, it is the combination of vm_pgoff and vm_file which respectively identify the file location and corresponding file containing the executable code, such as binary instructions, stored in the physical memory mapped to the virtual memory address range denoted by vm_start and vm_end.

To preserve the original vm_file, a new structure member, vm_old_file, may be added to the above-mentioned vm_area_struct. When kernel mapping code is requested to unmap memory behind the vm_area_struct (e.g., as described in connection with FIG. 8A, the fifth processing step above), the kernel code has been modified to additionally save the current value of vm_file to vm_old_file. Additionally, any other code of the kernel or other tool may be modified to use the file identified by vm_old_file. In this manner, all virtual memory management code of the operating system using this modified structure works properly in that it continues to access the HUGETLBFS file as identified by vm_file. All code, such as tools, interfacing with vm_file for address to object translation may use vm_old_file, if it has a file reference available (e.g. is not NULL). Otherwise, such code, such as the tools, may use the file identified by vm_file.

When the operating system starts, such as when the data storage system or computer system is booted, processing may be performed in one embodiment to exempt or reserve an amount of memory from the general system memory pool for use with techniques herein. The reserved amount of memory may be included in a huge pages pool for use with techniques herein. For example, one embodiment may reserve 256 MBs of memory for the huge pages pool for use with techniques herein whereby the 256 MBs of memory becomes unavailable for general allocation.

The LINUX operating system does not support transparent migration of file mapped code to use 2 MB huge pages rather than smaller 4 KB pages. Thus, in at least one embodiment in accordance with techniques herein, code of the sys_madvise system call may be modified to facilitate performing techniques herein.

For example, the following is a C-like pseudo code description of the modification to the sys_madvise system call that may be performed in a LINUX operating system for use with techniques herein:

```
sys_madvise (addr, size, flags)
/* VM region is defined by starting address "addr" with a
    length denoted by "size".
    "flags" identifies the use. When "flags" is MAD-
    V_HUGEPAGES, it denotes a trigger to migrate code
    and/or data mapped to the VM region from 4 KB pages
    to 2 MB pages */
:
if flags==MADV_HUGEPAGES then/* trigger perform-
    ing techniques described herein*/
{
    /* allocate enough memory to backup data—SECOND
        PROCESSING STEP—FIG. 5 */
    tmp=alloc (size);
    /* create backup—THIRD PROCESSING STEP—
        FIG. 6*/
        tmp identifies the copy destination, addr identifies
            the source location, and
        size identifies the amount of data from the source
            location that is copied* */
    memcpy (tmp, addr, size)
    /* unmap virtual memory (VM) region from 4 KB
        pages and map to huge 2 MB pages instead. VM
        region is defined by starting address "addr"---
        FOURTH, FIFTH and SIXTH PROCESSING
            STEPS—FIGS. 7, 8A and 8B */
    mmap (addr, size_aligned, MAP_ANONYMOUS|H-
        UGETLB)
    /* restore as before remap—SEVENTH PROCESS-
        ING STEP, FIG. 9
        addr identifies the copy destination, tmp identifies
            the source location, and
        size identifies the amount of data from the source
            location that is copied* */
    memcpy (addr, tmp, size);
    /* Cleanup-deallocation of temp—EIGHTH PROCES-
        SIN STEP, FIG. 10 **/
    free (tmp);
    return;
}
```

Thus, one embodiment in accordance with techniques herein using the LINUX operating system may first execute code in user mode or user space which loads the shared code library, such as a DLL, as described elsewhere herein, such as in connection with FIG. 4. Subsequently, the code may then invoke sys_madvise to trigger transfer of control to kernel mode and perform processing of the techniques herein to migrate contents (e.g., code and/or data) currently mapped to a specified region or portion of virtual memory using 4 KB pages to another portion of memory using 2 MB pages. In this example, the call to sys_madvise may perform processing to migrate contents (e.g., including the code and RO data) of the shared code library located in a virtual memory region currently mapped to physical memory using 4 KB pages to use 2 MB pages for the mapping of the virtual memory region to physical memory.

Following is an example of an invocation of the sys_madvise system call to begin processing of techniques herein to migrate contents (e.g., code and/or data) currently mapped to a specified region or portion of virtual using 4 KB pages to another portion of memory using 2 MB pages.

```
int ret=sys_madvise (from, length, MADV_HUGEP-
    AGES)
```
where
"from" identifies a starting virtual address;
"length" identifies a length or size; and
MADV_HUGEPAGES may be predefined flag value or indicator denoting that this call invocation is to trigger performing migration of the contents (e.g. code and/or data) currently mapped to a virtual memory address range (beginning at "from" and having a size denoted by "length") using 4 KB pages to use 2 MB pages. "Ret" may denote a return value from sys_madvise indicating whether the migration from 4 KB pages to 2 MB pages succeeded or failed. If ret indicates failure, the value of ret may further indicate one of multiple possible different failure states. For example, ret may indicate a first value if the migration failed but the original 4 KB mapping is still active and intact (e.g., as in FIG. 4) so no recovery is needed. Ret may indicate a second value if the migration failed and the original 4 KB mapping was destroyed thereby indicating that recovery is needed to restore the mappings to the state, for example, as in FIG. 4.

An embodiment may use an existing system call such as sys_madvise as described herein to transfer control to trigger execution of techniques herein in kernel mode. Alternatively, an embodiment may define another routine or function that may be invoked to trigger execution of techniques herein in kernel mode.

Figure 11:
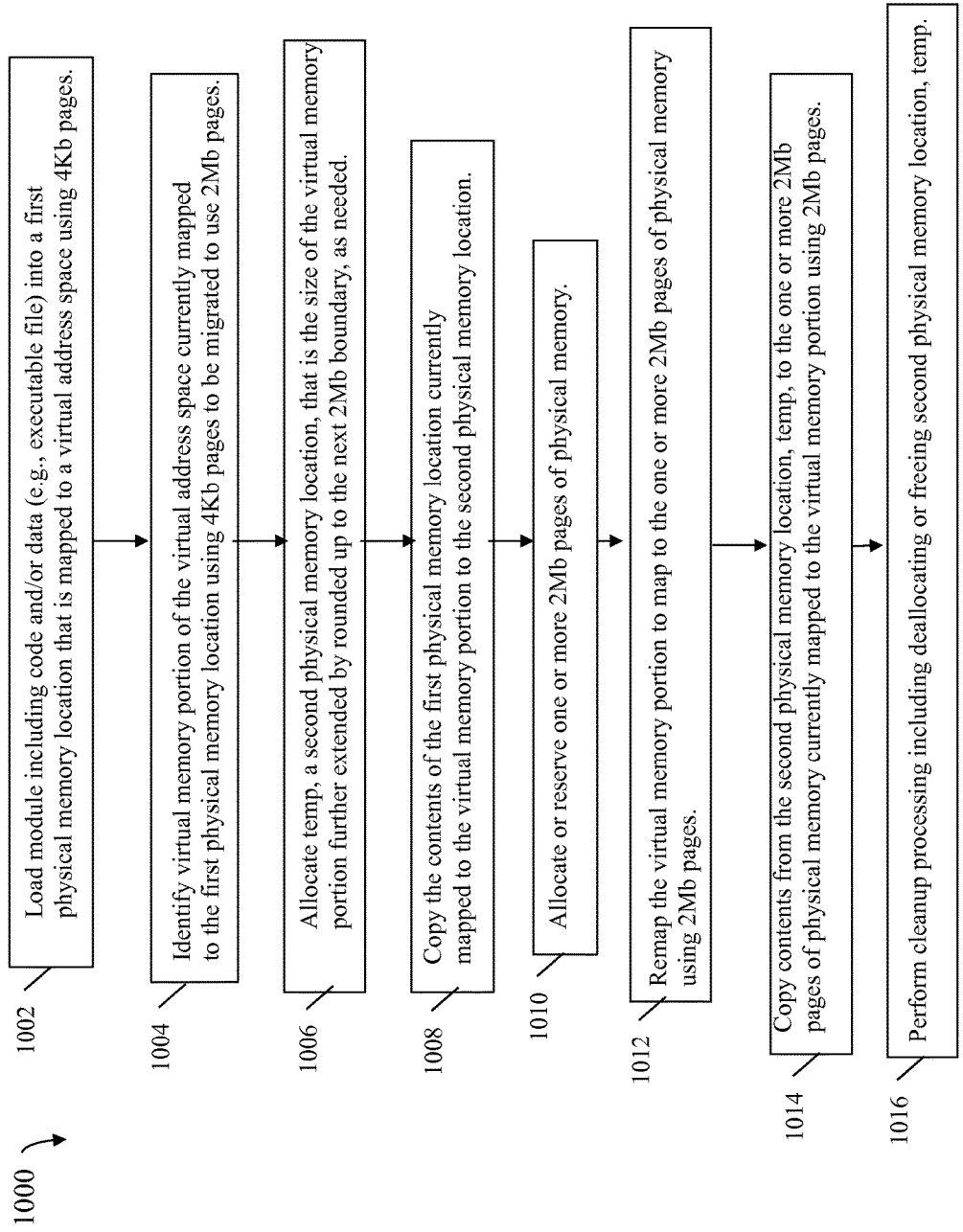
FIG. 11 is a flowchart of processing steps that may be performed in an embodiment in accordance with techniques herein.

Referring to FIG. 11, shown is a flowchart of processing steps that may be performed in an embodiment in accordance with techniques herein. The flowchart 1000 summarizes processing described above. At step 1002, a module including code and/or data may be loaded into a first physical memory location that is mapped to a virtual address space using 4 KB pages. This was described, for example, with reference to FIG. 4. The module may be, for example, an executable or binary file including any of code and data. For example, the module may be a shared library. Step 1002 may be performed, for example, by first code executing in user space that performs a call to load the module. The call to load the module may be a system call that causes code to execute in kernel mode to load the first module.

At step 1004, a virtual memory portion of the virtual address space is identified. The virtual memory portion may be currently mapped to the first physical memory location using 4 KB pages and the virtual memory portion is to be migrated to use 2 MB pages to map physical to virtual memory. For example, for the shared library, the virtual memory portion may correspond to code and RO data of the shared library.

At step 1006, temp, a second physical memory location, temp, is allocated that is the size of the virtual memory portion further extended by rounded up to the next 2 MB boundary, as needed. Step 1006 processing is described, for example, with reference to FIG. 5. The second physical memory portion is mapped to the virtual address space using 4 KB pages.

At step 1008, the contents of the first physical memory location currently mapped to the virtual memory portion is copied to the second physical memory location, temp. Step 1008 processing is described, for example, with reference to FIG. 6.

At step 1010, one or more 2 MB pages of physical memory are allocated or reserved. The number of 2 MB pages needed is equal to the size of the temp, the second physical memory location. Step 1010 processing is described, for example, with reference to FIG. 7.

At step 1012, the virtual memory portion is remapped to map to the one or more 2 MB pages of physical memory using 2 MB pages. Step 1012 processing is described, for example, with reference to FIGS. 8A and 8B.

At step 1014, contents from the second physical memory location, temp, are copied to the one or more 2 MB pages of physical memory currently mapped to the virtual memory portion using 2 MB pages. Step 1014 processing is described, for example, with reference to FIG. 9.

At step 1016, cleanup processing may be performed including deallocating or freeing second physical memory location, temp. Step 1016 processing is described, for example, with reference to FIG. 10.

As described herein in one embodiment in accordance with techniques herein, steps 1006, 1008, 1010, 1012, 1014 and 1016 may be performed as a result of the above-mentioned first code executing in user space (e.g., step 1002) that performs a second call to other code that executes in kernel mode. The other code that executes in kernel mode may perform the steps 1006, 1008, 1010, 1012, 1014 and 1016.

It should be noted that although examples herein may illustrate migration of a shared library from using 4 KB pages to using 2 MB pages, techniques herein may more generally be used to perform such migration in page size from a first page size to a second page size depending on what is supported in the particular embodiment's hardware and/or software. Additionally, the module is not limited to a shared library and may generally be any module that includes code and/or data. The data may have any attributes such as any of read, write and executable.

In one embodiment described herein such as on the LINUX operating system, content stored on the 2 MB pages of memory may be memory resident at all times and may not be swapped out of physical memory to disk or other non-volatile storage.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of mapping virtual memory to physical memory comprising:
   loading a first module into a first physical memory location that is mapped to a first virtual address space using a first page size;
   identifying a virtual memory portion of the first virtual address space, said virtual memory portion identifying a virtual address range that is mapped to at least a portion of the first physical memory location including the first module;
   copying first data to a second physical memory location, where the first data is included in the first physical memory location mapped to the virtual memory portion;
   identifying a set of one or more pages of physical memory, each of said one or more pages being a second page size different than the first page size;

remapping the virtual memory portion to the set of one or more pages using a page size that is said second page size; and copying the first data from the second physical memory location to the set of one or more pages of physical memory.

2. The method of claim 1, wherein said second physical memory location is mapped to the first virtual address space using pages of the first size.

3. The method of claim 1, further comprising:

deallocating the second physical memory location after completing said copying the first data from the second physical memory location.

4. The method of claim 1, wherein said first module includes any of code and data.

5. The method of claim 1, wherein the data is any of read only and read-write.

6. The method of claim 1, wherein the first page size is smaller than the second page size.

7. The method of claim 6, wherein the first page size is 4 kilobytes and the second page size is 2 megabytes.

8. The method of claim 1, wherein the first module is a shared library including code, read only data, and read-write data.

9. The method of claim 8, wherein the code and the read only data of the first module are included in the virtual memory portion.

10. The method of claim 9, wherein the read-write data is not included in the virtual memory portion.

11. The method of claim 1, wherein said loading the first module into a first physical memory location is performed by first code executing in user space performing a first call to other code in kernel mode to perform said loading.

12. The method of claim 11, wherein the first code performs a second call to second code that executes in kernel mode and causes said second code to perform processing including: said copying first data to a second physical memory location, said identifying a set of one or more pages of physical memory, said remapping, and said copying the first data from the second physical memory location to the set of one or more pages of physical memory.

13. The method of claim 1, wherein the method is performed in a data storage system.

14. The method of claim 1, wherein the method is performed in a computer system.

15. A system comprising:

a processor; and a memory including code stored thereon that, when executed, performs a method comprising:

identifying a first module currently stored in a first physical memory location that is mapped to a first virtual address space using a first page size;

identifying a virtual memory portion of the first virtual address space, said virtual memory portion identifying a virtual address range that is mapped to at least a portion of the first physical memory location including the first module;

copying first data to a second physical memory location, where the first data is included in the first physical memory location mapped to the virtual memory portion;

identifying a set of one or more pages of physical memory, each of said one or more pages being a second page size different than the first page size;

remapping the virtual memory portion to the set of one or more pages using a page size that is said second page size; and copying the first data from the second physical memory location to the set of one or more pages of physical memory.

16. A non-transitory computer readable medium comprising code stored thereon that, when executed, performs a method comprising:

identifying a first module currently stored in a first physical memory location that is mapped to a first virtual address space using a first page size;

identifying a virtual memory portion of the first virtual address space, said virtual memory portion identifying a virtual address range that is mapped to at least a portion of the first physical memory location including the first module;

copying first data to a second physical memory location, where the first data is included in the first physical memory location mapped to the virtual memory portion;

identifying a set of one or more pages of physical memory, each of said one or more pages being a second page size different than the first page size;

remapping the virtual memory portion to the set of one or more pages using a page size that is said second page size; and copying the first data from the second physical memory location to the set of one or more pages of physical memory.

17. The non-transitory computer readable medium of claim 16, wherein the method further includes loading the first module into the first physical memory location that is mapped to the first virtual address space using the first page size.

18. The non-transitory computer readable medium of claim 16, wherein said second physical memory location is mapped to the first virtual address space using pages of the first size.

19. The non-transitory computer readable medium of claim 16, wherein said first module includes any of code and data, and wherein the first page size is smaller than the second page size.

20. The non-transitory computer readable medium of claim 16, wherein a memory mapping structure is used by an operating system to identify a virtual to physical memory mapping and includes information that identifies the remapping of the virtual memory portion to the set of one or more pages using a page size that is said second page size, and wherein the memory mapping structure identifies a first file on a first file system used by the operating system, and the method further includes modifying the memory mapping structure to additionally identify a second file including the first module.

* * * * *